UNITED STATES PATENT OFFICE.

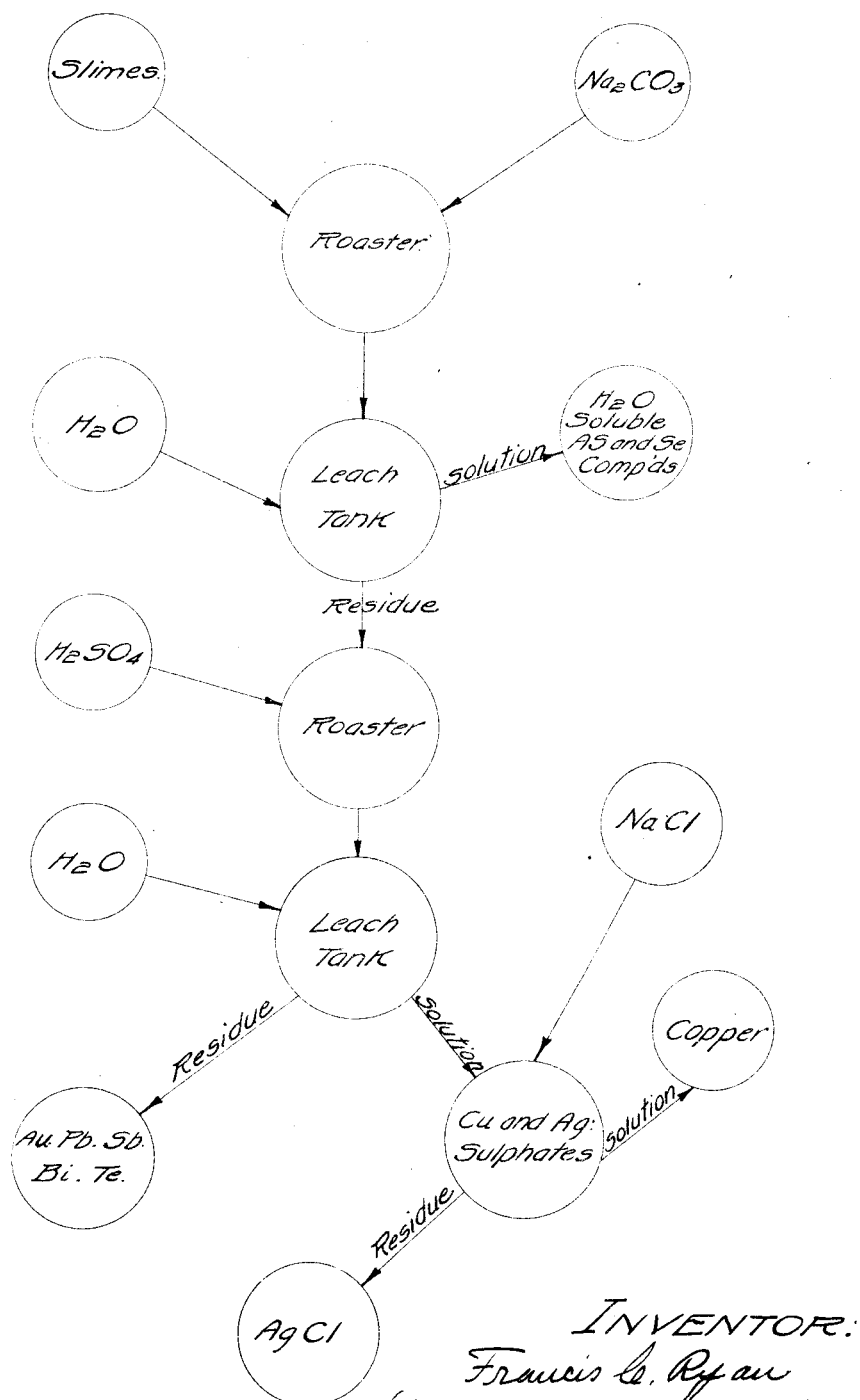

FRANCIS C. RYAN, OF HAMMOND, INDIANA, ASSIGNOR OF ONE-HALF TO UNITED STATES METALS REFINING COMPANY, OF CHROME, NEW JERSEY, A CORPORATION OF NEW JERSEY.

PROCESS OF TREATMENT OF ANODE-SLIMES AND SIMILAR MATERIALS.

1,185,005.  Specification of Letters Patent.  Patented May 30, 1916.

Application filed February 24, 1914. Serial No. 820,651.

*To all whom it may concern:*

Be it known that I, FRANCIS C. RYAN, a citizen of the United States, residing at Hammond, in the county of Lake and State of Indiana, have invented certain new and useful Improvements in Processes of Treatment of Anode-Slimes and Similar Materials; and I do hereby declare the following to be a full, clear, and exact description of the invention, such as will enable others skilled in the art to which it appertains to make and use the same.

The invention relates to a method of treating finely divided mineral bearing materials such as anode slimes, furnace fumes or flue dust, for the purpose of recovering the gold, silver and other values contained therein.

The object of the invention is to provide a novel and improved method which will enable a high percentage of the values contained in the material treated and especially of the gold and silver to be economically recovered without danger of exposing the operator to poisonous fumes.

In the accompanying drawings several steps of the preferred form of the method are diagrammatically illustrated.

The feature of the invention accordingly contemplates the removal of impurities such as arsenic and selenium which ordinarily contaminate the more valuable constituents by converting these disturbing elements to water soluble compounds which may be removed by leaching, thus purifying the materials without the production of poisonous fumes. In accordance with the preferred form of the invention, this is accomplished by mixing soda ash or other soluble alkali carbonate with the material and roasting at or below a dull red heat. This converts the arsenic and the selenium, if present, into water soluble compounds according to the following equations:

$$2As + 3O + Na_2O = 2NaAsO_2$$
$$2As + 5O + Na_2O = 2NaAsO_3$$
$$Se + O_2 + Na_2O = Na_2SeO_3$$

with very little if any volatilization and consequent danger to the operators. The temperature used will vary with the character of the material treated, and for the best results should be such that the reactions will be substantially completed before sintering starts, as otherwise occluded particles of the charge may not be attacked by the alkali carbonate. The materials are then crushed, if necessary, leached with water and filtered, thus removing the soluble arsenic and selenium compounds and other soluble impurities, and leaving a purified residue to be treated for the recovery of the metal values contained therein.

In the further practice of the invention, the materials purified as above described are roasted with sulfuric acid ($H_2SO_4$). This sulfates the materials, converting the metals and metallic compounds, with the exception of gold, into sulfates, according to the representative equation, $$2Ag + 2H_2SO_4 = Ag_2SO_4 + SO_2 + 2H_2O$$

The materials are then crushed, if necessary, leached with hot water and filtered. Sufficient water should be used to take up the copper sulfates, the greater part of the silver sulfates, and to insure the precipitation of basic sulfates of bismuth, tellurium and antimony, according to the following equation, $$Bi_2(SO_4)_3 + XH_2O = Bi_2O_3 SO_3 XH_2O.$$

if these elements are present in the materials being treated, so that they will remain in the residue. Most of the silver is thus removed, and a clean solution of silver and copper sulfates is secured which is practically free from impurities, and from which the silver and copper may be readily recovered by any suitable or well known method as by adding a soluble chlorid, such as sodium chlorid, to precipitate silver chlorid, then filtering and running the filtrate over iron to recover the copper.

After most of the silver and the copper have been thus removed from the materials, the residue may be treated by any suitable or well known method to recover the gold, the remaining silver, and later the lead, bismuth and antimony.

Having explained the nature and object of the invention, and one manner in which it may be practised, what is claimed is:—

1. The method of treating mineral bearing material containing arsenic, selenium, gold, silver, copper and the like comprising roasting the slime with alkali carbonate, leaching with water, filtering to eliminate the arsenic and selenium, and roasting the residue in the presence of sulfuric acid to sulfate the silver and copper for separation from the unsoluble gold.

2. The method of treating mineral bearing material containing arsenic, selenium, gold, silver, copper and the like, comprising roasting the slime with sodium carbonate at a temperature which will complete the reaction of the materials before the mass sinters, leaching the sintered mass, filtering to remove arsenic and selenium, and roasting the residue in an oxidizing roast in the presence of sulfuric acid to sulfate the silver and copper, and separating the gold from the silver and copper.

3. The method of treating mineral bearing material containing arsenic, selenium, bismuth, antimony, gold, silver, copper and the like, comprising roasting the material with an alkali carbonate, leaching and filtering the roasted material to remove selenium and arsenic, roasting the residue free of arsenic and selenium with sulfuric acid, and treating with water to precipitate the sulfates of bismuth and antimony, filtering and treating the filtrate to recover silver.

4. The method of treating mineral bearing material containing arsenic, selenium, gold, silver, copper, bismuth, tellurium, antimony and the like, comprising roasting the material with an alkali carbonate, leaching and filtering the material to remove arsenic and selenium, roasting the filtered residue with sulfuric acid, and treating the roasted material with sufficient water to dissolve the copper and silver and precipitate the basic sulfates of antimony and bismuth, filtering to separate the gold, antimony and bismuth from the copper and silver in solution and treating the solution with sodium chlorid to precipitate silver.

5. The method of treating mineral bearing material containing arsenic, selenium, gold, silver, copper, bismuth, tellurium, antimony and the like, comprising roasting the material with an alkali carbonate at a temperature low enough to complete the reaction of the materials before the mass sinters, leaching to remove the soluble arsenic and selenium, roasting the residue at red heat in the presence of sulfuric acid, and leaching with sufficient water to precipitate bismuth, tellurium and antimony and filtering to get a substantially pure copper, silver sulfate solution.

FRANCIS C. RYAN.

Witnesses:
W. H. GOETLIS, Jr.,
JOHN N. BECKMAN.